June 24, 1952 — I. R. BRENHOLDT — 2,601,249

PIPE LINE SCRAPER AND LOCATION TRANSMITTER

Filed June 27, 1950 — 5 Sheets-Sheet 1

INVENTOR.
Irving R. Brenholdt
BY
Oliv E. Williams
ATTORNEY

June 24, 1952     I. R. BRENHOLDT     2,601,249
PIPE LINE SCRAPER AND LOCATION TRANSMITTER
Filed June 27, 1950     5 Sheets-Sheet 5
NORTH
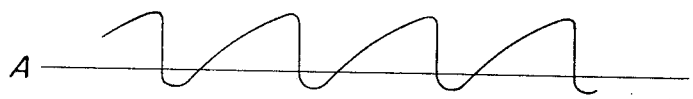
A
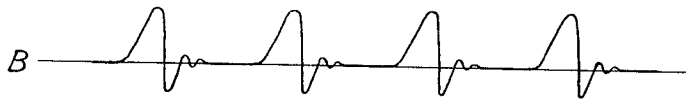
B
C
D
*Fig. 8*
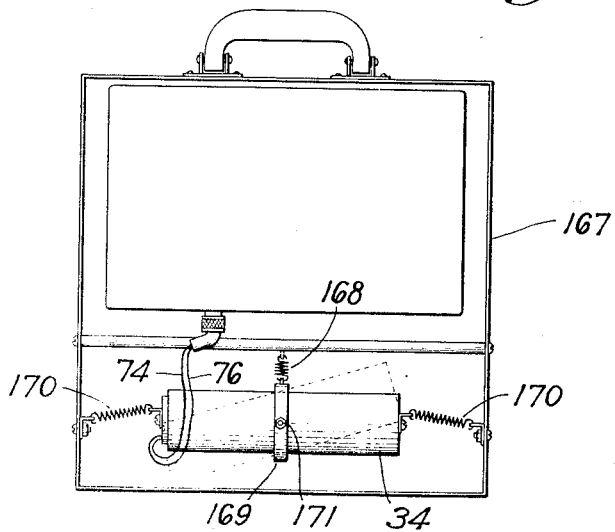
*Fig. 9*
INVENTOR.
Irving R. Brenholdt
BY
ATTORNEY Patented June 24, 1952

2,601,249

UNITED STATES PATENT OFFICE 2,601,249

PIPE LINE SCRAPER AND LOCATION TRANSMITTER

Irving R. Brenholdt, Chicago, Ill., assignor to Standard Oil Company, Chicago, Ill., a corporation of Indiana Application June 27, 1950, Serial No. 170,611

5 Claims. (Cl. 175—183)

This invention relates to apparatus for locating cleaning apparatus in pipe lines and has reference more particularly to signalling devices for locating, or tracing the course of, such cleaning apparatus. This application is a continuation-in-part of inventor's copending application Serial No. 68,205, filed December 30, 1948.

Pipe lines frequently become obstructed with sediment, deposited paraffins and the like and must be cleaned in order to restore normal unobstructed flow of the line. A device commonly employed for such cleaning is a scraping apparatus known as a go-devil, which is forced through pipe lines by the pressure of fluid flowing therethrough. The operation of such pipe line cleaners is attended by the disadvantage that they occasionally encounter and are stopped by obstructions, and are then difficult to locate particularly inasmuch as they are often employed over considerable distances and their rate of travel can only be approximated.

It is, therefore, an object of the present invention to provide means and apparatus for locating go-devils in pipe lines. It is another object of the invention to provide signalling apparatus whereby the position of the pipe line cleaner can be located at any time during its travel through a pipe line and in order, also, that its rate of travel can be accurately determined. A further object of the invention is the provision of a method for locating pipe line cleaners and determining the approximate rate of travel so that crews can be called to pipe-scraper traps only shortly before the arrival of the pipe scraper and thus unproductive delay periods can be avoided.

The invention has for other objects such other advantages or results as will appear in the description of the apparatus hereinafter given.

The customary depth of pipe lines renders unsatisfactory reliance upon sound emitting devices for the purpose of locating pipe line scrapers, and furthermore places severe limitations upon the type of signal that may be employed for indicating pipe-line-scraper location. In addition, the inherent nature of the pipe line is usually such that the pipe itself would filter out or block the signal and prevent it from reaching the surface. The employment of the radar echoing method is suitable insofar as the fact that an ultra high frequency wave would carry through a steel pipe of circular section, but interferences arising from imperfection in the pipe, such as roughness at the welded joints and corroded sections, would seriously diminish the signal strength both by absorption and reflection. Sound waves, beforementioned, would require an excessive power source in view of the space and weight limitations of a signaling device suitable for incorporation within the scraper. A second disadvantage of sonic devices is the loss of intensity which occurs when an acoustical wave travels from the earth to the air. This loss in intensity is great enough to incur the disadvantage of requiring an earth sounding in order to pick up the signal. High frequency waves would be useless in the present instance because of their inability to penetrate the steel walls of the pipe line. The use of radioactive sources is precluded by the fact that earth layers above the pipe line of greater depth than about two feet would require dangerously strong radioactive sources, for example, of considerably greater than a reasonably safe 10 millicuries intensity.

It has now been found that the aforementioned objects can be accomplished by the employment of low frequency electromagnetic waves which will give rise to an induced field external to the pipe and will produce a readily identifiable signal at and above the surface of the ground. Briefly stated, the present invention comprehends, therefore, the provision of a signal transmitter comprising an electromagnet oscillating at a fixed low frequency combined with a pipe line scraper in such manner as not to interfere with operation of the latter, and suitable receiving apparatus adapted to receive, amplify and convert the electromagnetic impulse to an audible, visual, or recorded signal. This low frequency electromagnetic source is operably connected to a battery and a fixed frequency interrupter whereby the electromagnet is energized at a fixed uniform rate between about 5 to 50 times per second. The interrupter and electromagnetic circuit is further characterized by a delay means for keeping the interrupter circuit closed for a sufficient time that the electromagnet is energized until at least that magnetic flux density is generated which can be detected by the receiver and preferably until a substantially maximum flux density is generated. The interrupter apparatus can comprise a relay means which can be an electrical relay, in which case the delay element will comprise a capacitor shunted across the relay (cf. Fig. 4) or the relay means can comprise a vibrating reed (cf. Fig. 1). When using a vibrating reed or similar device, the delay element or means is preferably a leaf spring or vibrating element that will remain in electrical contact with the reed long enough to permit the electromagnet to reach substantially maximum flux density.

The receiver apparatus includes, in addition to amplifying means, circuits so arranged as to filter out adventitiously present signals, particularly those derived from 60 cycle current and those arising from movement of receiver apparatus in the earth's field; for example, bridged T filters and negative feed-back filter circuits are employed. Whether the apparatus is adapted to observe the passing of the pipe line scraper at any point, or whether the signal denoting the presence of the scraper is to be transmitted, for example, by wireless telegraph, to a central receiving station, or is to be received as an audible signal in the field, the combined apparatus is within the scope of the invention. In case an audible signal is to be received, the receiver includes means for converting a signal from the low electromagnetic frequency aforestated to one within the audible range.

The provision of a relatively precise rate of vibration of the electromagnet and of the low frequency of the electromagnetic wave emanating therefrom is an important feature of the present invention because the receiver apparatus, as hereinafter described in greater detail, selects only the desired frequency and then amplifies and modifies this impulse to produce an observable signal giving notice of the presence of the scraper. The importance of maintaining a uniform frequency is emphasized by the fact that the strength of the signal received by means of a selective receiver will be reduced as much as 50% by a variation in the magnetic frequency of as much as two or three cycles per second.

Heretofore it has been customary for a repair crew to go to a pipe-scraper trap in a pipe line sometime after the scraper has been inserted at the opposite end and wait while the scraper traverses the distance between pipe traps, usually about 40 miles. The present invention contemplates within its scope the utilization of the improved pipe line apparatus and the establishment of stations a short distance from the pipe traps, which stations will have receiver apparatus such as the above described and preferably automatic communication from such stations to a central receiving point. When the pipe scraper passes the said station the signal received at the said central point will announce its passage and repair crews can be notified of the expected time of arrival of the pipe scraper.

The embodiments of the invention in which there are employed two different devices for governing the frequency of the electromagnetic waves that are emanated from the pipe line scraper, are illustrated in the drawings of which:

Fig. 8 is an illustration of typical wave shapes of electromagnetic signals, including superimposed interfering signals and a resultant audible signal; and Fig. 9 is an elevational view of the case containing the receiver apparatus and showing a preferred mounting of receiver equipment.

Figure 1:
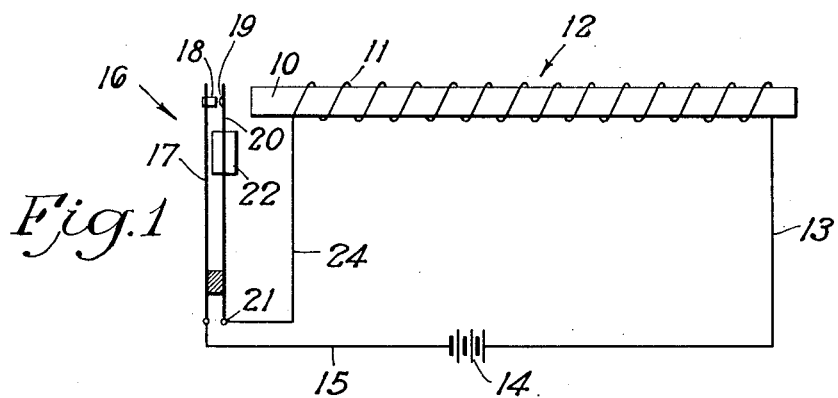
Fig. 1 is a schematic diagram of a transmitter employing an electromagnet and an interrupter switch having a vibrating reed.
Figure 2:
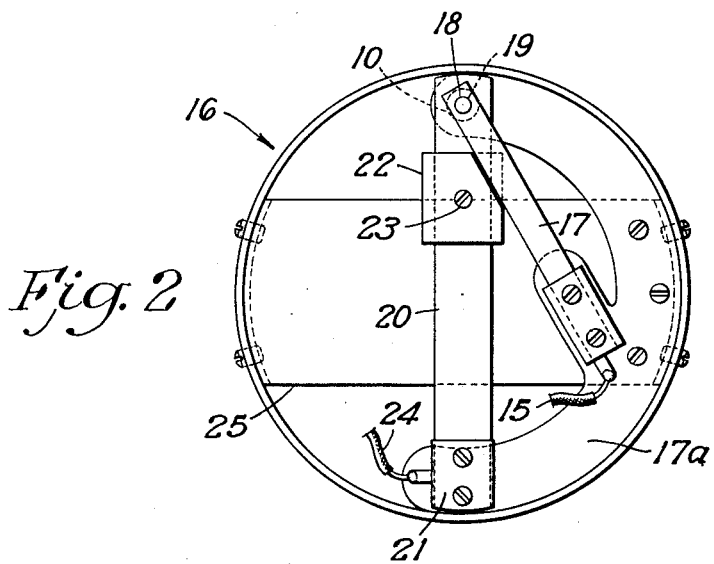
Fig. 2 is an end elevation showing the interrupter switch that governs the frequency of the transmitter.

Referring specifically to Fig. 1, an elongated core 10 consisting of a metal, such as soft iron, is wrapped with a coil 11 of preferably a copper wire to compose an electromagnet 12. The coil 11 is operatively connected by a wire 13 to a battery or series of batteries 14 schematically illustrated in the said figure. A wire 15 leads from the said battery 14 to an interrupter switch 16 that is shown in detail in Fig. 2. The switch includes a leaf spring 17 that is securely fixed at one end to a supporting member 17a and is attached to the said wire 15. Disposed on one surface of the leaf spring 17 is a contact point 18 which intermittently comes into contact with an oppositely disposed contact point 19 forming an integral part with a vibrating reed 20. The vibrating reed is fixedly attached to the supporting member 17a at fulcrum point 21 and bears a slidable weight 22 that is held in position on the reed 20 by a set screw 23. The said reed 20 can be an attenuated rod or bar and is preferably a flat strip of metal not more than about four inches long and about one-quarter inch wide. Connected to the reed 20 at the fulcrum point 21 is a wire 24 which leads therefrom to connection with the said coil 11. As shown in Fig. 2 the entire interrupter switch 16 is mounted on a cross bar 25 that is secured to a cylinder by screws as shown and that serves also to retain the batteries 14 within the cylinder.

As can be seen from the circuit diagram of Fig. 1, during operation of the transmitter and the oscillating electromagnet 12, the vibrating reed 20 oscillates between the leaf spring 17 with which it makes contact at the point 18, and one end of the said core 10, which attracts the reed magnetically. When the reed is in a position such that contact points 18 and 19 are in contact with each other, current will flow from the battery 14 through said leaf spring 17, the vibrating reed 20, wire 24 and coil 11. This flow of current through the coil 11 effects a magnetization of the core 10 and emanation of electromagnetic waves which soon reaches a maximum value. The magnetized core 10 attracts the reed 20 and pulls it away from the leaf spring 17. For a small portion of the travel of the vibrating reed 20 toward the core 10 the point 18 of leaf spring 17 remains in contact with the vibrating reed 20 so that current will continue to flow through the coil 11 for a period of time that can be adjusted to provide a maximum emanation of electromagnetic waves from the electromagnet 12. This is readily accomplished by the illustrated device by disposing the leaf spring 17 in such a manner that its natural position is within the arc described by the vibrating reed. The distinctive nature of this interrupter device is to be found in the fact that the vibrating reed will naturally vibrate at a fixed frequency which can be adjusted accurately by movement of the said weight 22 along the axis of the reed 20.

Figure 3:
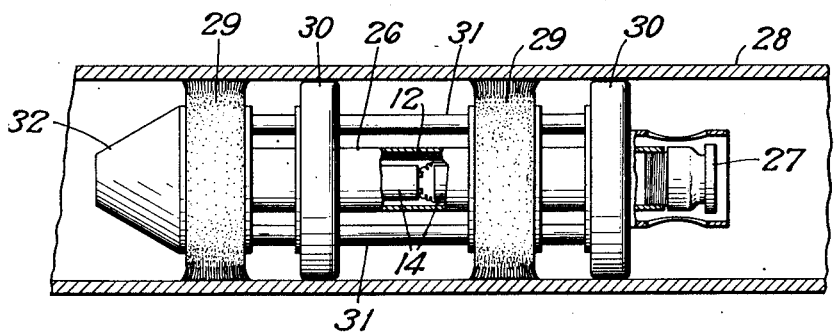
Fig. 3 is a typical pipe line scraper with parts broken away in order to show the disposition of the transmitter in the pipe line scraper.

The entire transmitter assembly, including the batteries 14, interrupter switch and the electromagnet 12 arranged in the supporting cylinder can then be inserted into a hollow tube 26 and enclosed therein by a threaded plug 27. The tube 26 constitutes the central shaft of the pipe line scraper illustrated in Fig. 3 and shown disposed within pipe 28. The pipe line scraper of Fig. 3 is conventionally equipped with wire brushes 29 and rubber rimmed driving discs 30 and several longitudinally extending supporting tubes or grommet pipes 31 through which the fluid in the pipe line can be permitted to flow during operation of the pipe scraper. The forward end of the scraper relative to its course of travel in the pipe line is constructed in the form of a cone 32 to adapt the scraper as an effective displacement tool.

As will be hereinafter described in greater detail with reference to Fig. 5, the fluctuations in magnetic intensity of electromagnet 12 will radiate to the pipe 28 and effect resultant wave forms, which will convey the signal to the pick-up coil 34 of the receiver apparatus.

Figure 4:
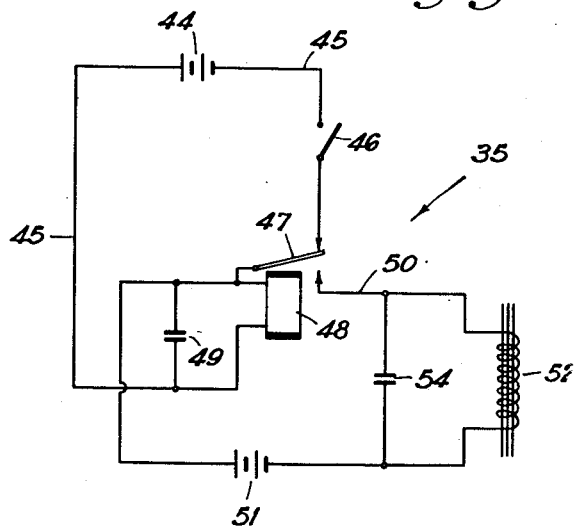
Fig. 4 is a circuit diagram of a transmitter in which the oscillating rate of the electromagnet is governed by a condenser-and-energized-core interrupter illustrated schematically therein.

Shown in Fig. 4 is the circuit diagram of a signal transmitter 35 that can be arranged similarly to that illustrated in Fig. 1 so that this transmitter also can be inserted in the hollow tube 26 of a pipe line scraper. Transmitter 35 consists of an oscillating, battery-powered electromagnet circuit and an interrupter circuit. The interrupter circuit comprises a battery 44 which supplies current through a lead 45 in which is disposed a manually operated switch 46, and a relay consisting of an armature 47, a wound core 48 and a condenser 49. Current flowing through the core 48 attracts the armature 47 thereby causing movement of the armature and the breaking of the said interrupter circuit. The armature 47 is held in retained position against or close to the wound core 48 for a brief moment longer by the flow back of current previously stored in the condenser 49. When this charge is dissipated, the armature is released and current again flows into the wound core 48. The period of this oscillation can be controlled by selecting the capacity of the condenser 49. In one example, the selected condenser had a capacity of 25 microfarads and the wound core a resistance of 10,000 ohms with the result that an oscillation of about twenty times per second was obtained. When the armature is held in such position that the interrupter circuit is opened, the electromagnet circuit including lead 50 will be closed. This circuit comprises the said lead, a battery 51 (of 12 volts in the given example), the armature 47 and an electromagnet 52 consisting of a wound iron core of approximately 6,000 turns. A condenser 54 of about 10 microfarads capacity was disposed across the lead 50 for the purpose of preventing sparking at the armature.

Figure 5:
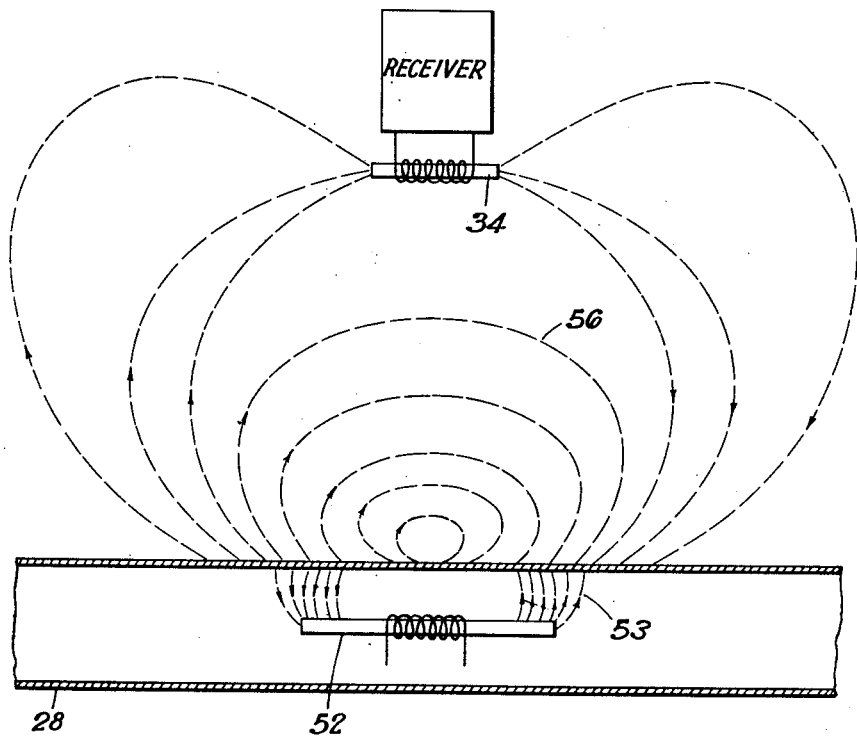
Fig. 5 is a diagram of the wave pattern produced by the oscillating electromagnet described in the preceding drawings.

The field produced by the said electromagnet 52 is shown diagrammatically in Fig. 5. The electromagnet 52 of Fig. 5 (or the electromagnet 12 of Fig. 1) is shown separated from other elements of its assemblage and is disposed longitudinally in a pipe 28. A primary field produced by the electromagnet at one point in its oscillation is indicated by magnetic flux lines 53 and the secondary induced field by lines 56. Disposed within the electromagnetic secondary field is the pick-up coil 34 which forms an integral part of the receiver apparatus described in Figs. 6, 7 and 9.

Figure 6:
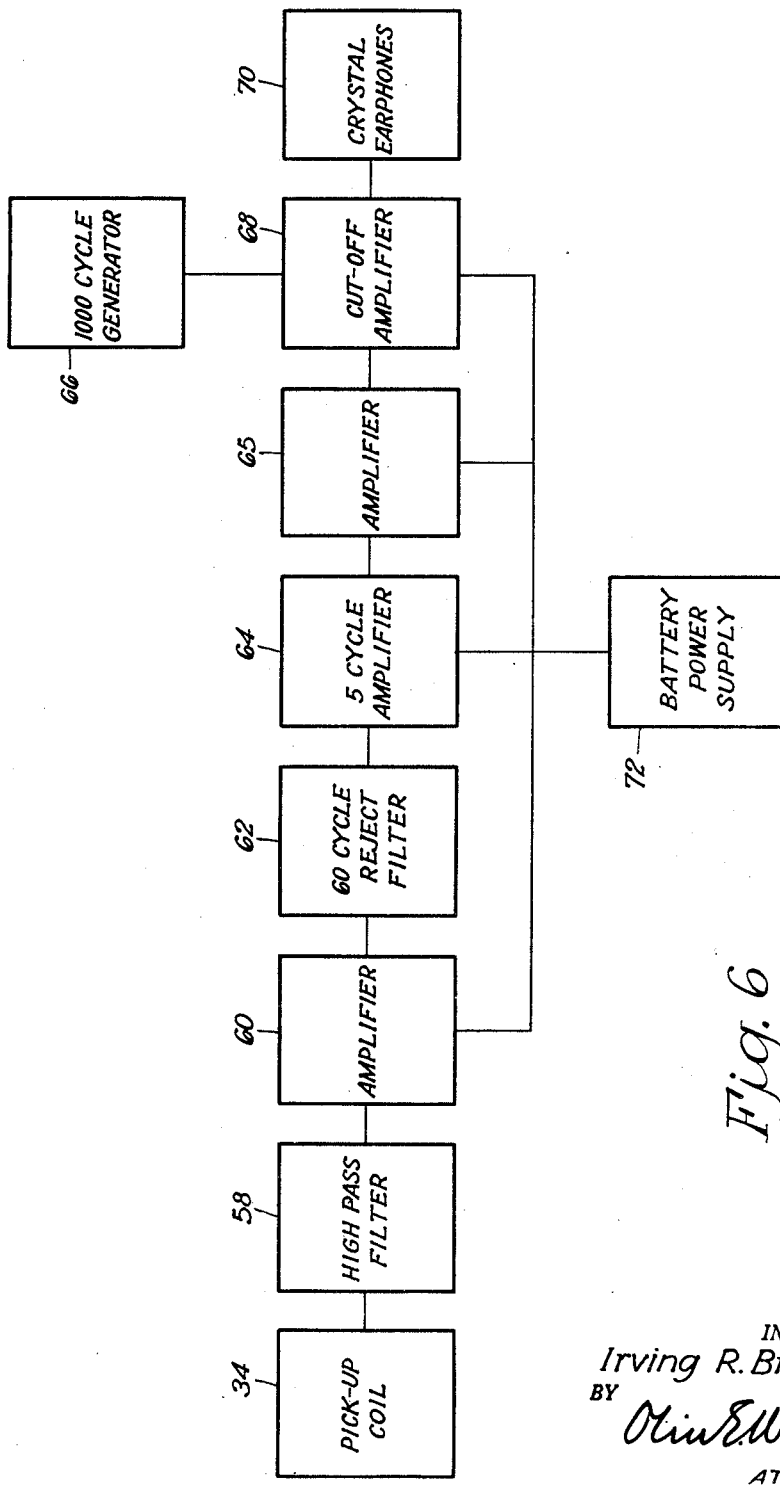
Fig. 6 is a schematic diagram of receiver apparatus that is suitable for use with either transmitter and is adapted to produce an audible signal.

Referring now to the schematic diagram of the detector apparatus illustrated in Fig. 6, the pick-up coil 34 intercepts the oscillating magnetic field shown in Fig. 5. The voltage impressed upon the pick-up coil 34 includes, in addition to the uniformly pulsating signal from the electromagnet, all undesirable signals of varying frequencies. A major portion of the low frequencies incidentally produced by movement in the earth's field of the detector apparatus, which can be portable and is ordinarily housed in a carrying case, are eliminated by a high-pass filter 58. An improved mounting of the pick-up coil 34, shown in detail in Fig. 9, also minimizes interfering signals. The resultant signal is directed to an amplifier circuit 60. The amplified signal is thereafter directed to a pair of interference filters 62 designed to eliminate particularly sixty cycle signals that may be induced by nearby power transmission lines and includes a negative feed-back circuit shown in greater detail in Fig. 7. The resultant 20 cycle per second signal is amplified by an amplifier circuit 64 and an additional amplifier 65 and thereafter serves to key a 1,000 cycle per second signal produced by the saw-tooth wave neon tube generator 66 whereby the 1,000 cycle per second signal is permitted to pass through the cut-off amplifier circuit 68 only at 20 cycle per second intervals. This audible signal is received by crystal earphones 70. A delay circuit, now shown, can be incorporated in the amplifier circuit or electronic switch 68. This circuit will delay the action of the switch until several continuous cycles are received and will eliminate signals arising from abrupt movements of the receiver in the earth's field. The power for amplifiers 60, 64, 65 and 68 is supplied by a battery 72.

Figure 7:
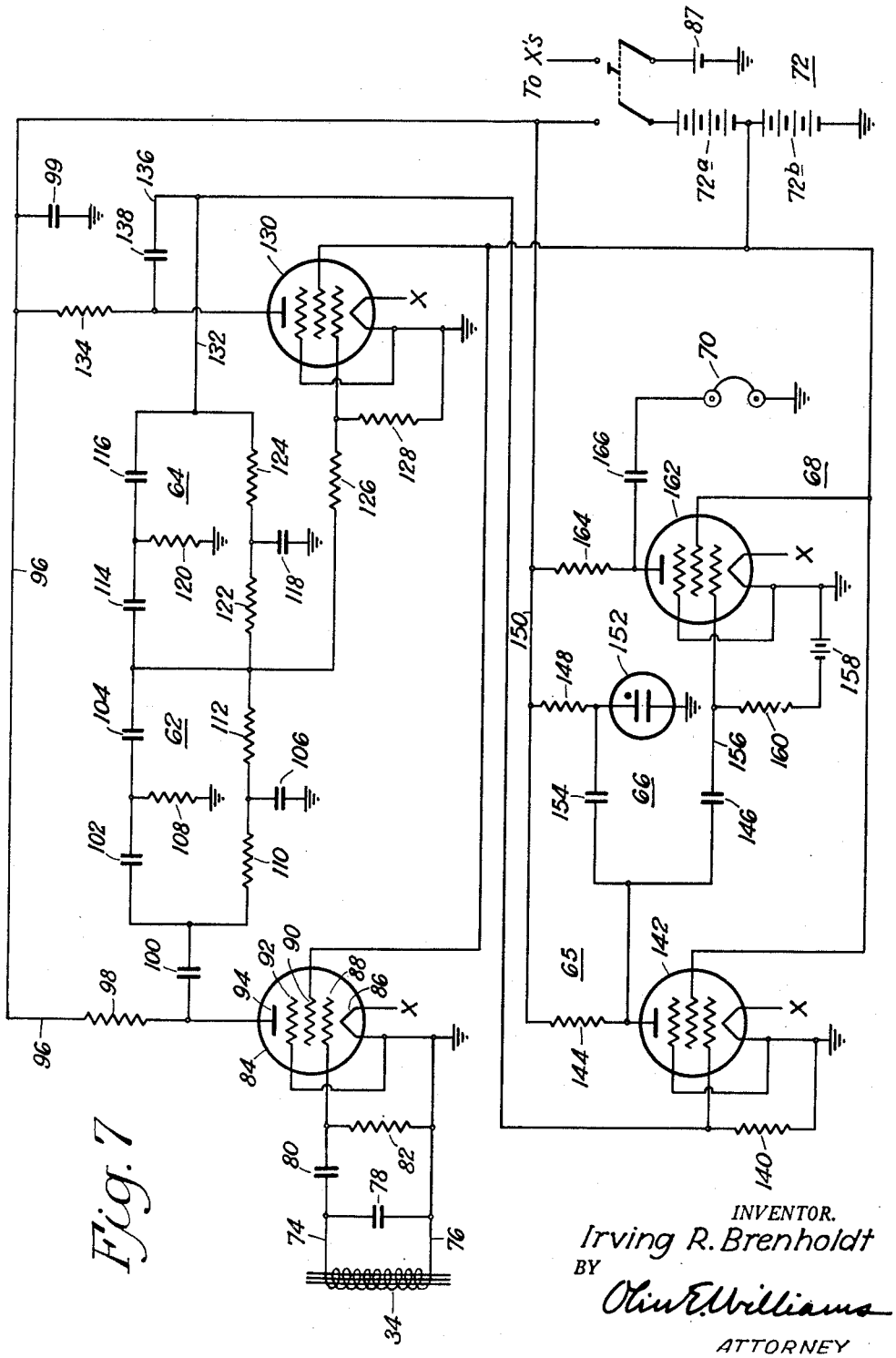
Fig. 7 is a circuit diagram of the receiver illustrated schematically in Fig. 6.

Fig. 7 shows in considerably greater detail the electrical circuit constituting the receiver apparatus. Extending from the pick-up coil 34 are leads 74 and 76 across which is connected a condenser 78 tuned in resonance with the coil 34 at the frequency of 20 cycles per second. A condenser 80 disposed in line 74 constitutes the high pass filter 58 for incidental elimination of the very low frequencies generated by waving the receiving case, and acts further as a coupling condenser. Disposed across the leads 74 and 76 is a grid resistor 82. Pentode 84 of conventional construction consists of a filament 86 supplied through a lead (not shown) by a battery 87, controlled grid 88, screen grid 90, suppressor grid 92 and plate 94 upon which is imposed a voltage of 90 volts supplied through lead 96 having disposed therein a plate load resistor 98, and by-pass condenser 99. A coupling or blocking condenser 100 delivers the amplified signal from the pentode 84 to a bridged T type interference filter 62 of conventional arrangement. The circuit includes condensers 102, 104, and 106 and resistors 108, 110, and 112. The values of these components are selected so as to eliminate 60 cycle frequencies. The resulting voltage filtered at 60 cycle interfering frequency, is imposed on an interference filter and 20 cycle amplifier which includes condensers 114, 116 and 118 and resistors 120, 122 and 124. The interference filter is a part of a negative feed-back circuit which also includes resistor 126, grid resistor 128, plate load resistor 134, coupling condenser 138, and pentode 130. The pentode 130, upon which is imposed a plate voltage of 45 volts from the lead 96 and plate load resistor 134 delivers a reversed signal containing all frequencies received from interference filter 62 to the lead 136, containing the coupling condenser 138. All such frequencies are fed through to the interference filter in reversed phase to the input lead of amplifier tube 130 with the exception of the 30 cycle signal which is removed by the filter. The undesirable frequencies are thereby cancelled out by the reversed phase signals. The remaining amplified 20 cycle signal which alone remains and is present on the output lead 136 is thereafter delivered to the amplifier circuit 65 containing conventional grid resistor 140, pentode 142, plate load resistor 144, and coupling condenser 146.

The saw-tooth-wave neon tube generator 66 comprises a resistor 148 through which voltage is delivered from the lead 150. Disposed in the generator circuit is a condenser 154 of such capacity that neon tube 152 will become ionized and conduct accumulated charge from the said condenser 154 away to ground at intervals of approximately 1,000 cycles per second. The superimposed signal comprising both 1,000 cycles per second and 20 cycles per second frequencies is produced in a lead 156 from the coupling condenser 146 to the cut-off amplifier circuit 68 that comprises a negative grid bias battery 158, a resistor 160, a pentode 162, a plate load resistor 164 and a coupling condenser 166. The cut-off amplifier 68 functions in such manner that the superimposed wave signal delivered thereto decreases the negative potential on the grid of the pentode 162 at those moments at which the aforesaid signal is at a maximum positive potential and therefore a signal similar to that shown in Fig. 8, wave diagram D, is delivered to the said earphones 70. The battery power supply 72 imposes approximately 45 volts positive potential upon the screen grids 90 of the pentodes 84, 130, 142, and 162 and a 90 volt potential is supplied through leads 96 and 150 to the various resistors disposed therebetween and the plates 84 of the pentodes.

The table of preferred values for the above described circuit in one employed embodiment of the apparatus is hereinafter given:

| Condensers | Microfarads |
| --- | --- |
| 78 | .07 |
| 80 | .005 |
| 100, 138, 146 | 0.01 |
| 114, 116 | 0.02 |
| 102, 104, 166 | .001 |
| 106 | .013 |
| 116 | .015 |
| 89 | 50 (150 volts) |
| 154 | .0002 |

| Resistors | Megohms |
| --- | --- |
| 98, 134, 144, 164 | 0.18 |
| 110, 112 | 1.0 |
| 108 | 2.7 |
| 122, 124 | 2.0 |
| 120 | 0.34 |
| 148 | 4.7 |
| 82, 126, 128, 140, 160 | 10.0 |

| Batteries | Volts |
| --- | --- |
| 158 | 7½ |
| 72a and 72b | 45 |
| 87 | 1½ |

If it is desired to eliminate even further incidental signals which may reach the receiver as a result of sudden movements of the pick-up coil in the earth's field and other types of discontinuous interference, the aforementioned additional delay circuit (not shown) can be added to the receiver-amplifier and be connected between the plate load resistor 144 and the pentode 162. This circuit comprises a capacitor, a resistor, and a diode tube (or an additional diode in the pentode 162). This delay circuit is isolated from the 1000 cycle generator 66 by a resistor which is disposed between the plate load resistor 144 and the said generator 66 and which, when employed in a circuit having the values given in the above table, had a value of 100,000 ohms. Connected ahead of this resistor is a line extending to the additional diode in pentode 162. Disposed in this line is a resistor of, for the given example, 4.7 megohms across which is shunted a capacitor of, in the example, 4 microfarads.

When a 20 cycle per second signal from the amplifier is applied to the input the positive half cycle of the first cycle of the signal is almost completely cut off through the effect of the circuit comprising the capacitor and the diode. The resulting current flow through the diode charges the capacitor to some fraction of the voltage of the positive half cycle and therefore, the plate of the diode becomes negative with respect to ground by the amount of this voltage. Succeeding positive half signals continue to be cut off, but this reduction in voltage diminishes with each cycle as the diode plate becomes more negative. The given values of the resistor and capacitor are selected so that after about five successive cycles, a stable condition exists in which the small charging current to the capacitor, supplied by the positive half cycles of the signal voltage, is equal to the discharge current through the resistor. Under this condition the signal maintains almost its full amplitude. Thus discontinuous interference signals will be substantially nullified and only the continuous 20 cycle per second signal will be effective in the circuit.

Fig. 8 consists of a series of wave patterns such as are produced by the hereinbefore described apparatus. Curve A indicates the wave pattern and polarity of the magnetic flux induced by the oscillating electromagnetic transmitter. The voltage input to the first amplifier of the receiver apparatus that is described in Figs. 6 and 7 is shown without superimposition of interfering signals in Curve B. This voltage input is induced by the electromagnetic field shown in Fig. 5 and illustrated as to wave pattern and polarity by Curve A. Curve C represents the 1,000 cycle per second saw-tooth wave produced by the neon tube generator 66. Curve D represents the resultant audible signal provided by the interruption of the 1,000 cycle per second signal at 20 cycle per second intervals.

The pick-up coil 34 is shown in Fig. 9 suspended in a receiver carrying case 167 at its center of gravity by spring 168 to which is attached supporting trunnion ring 169. Springs 170 loosely retain the coil in horizontal position and are attached from each end of the coil to the sides of the carrying case. The said trunnion ring 169 pivotally holds the coil at its center of gravity 171 and consequently prevents net angular movement of the coil in the earth's field. Movement of the coil in the earth's field about its center of gravity will always be balanced by opposite movement of the opposite end of the coil and will not, therefore, cause an interfering signal. The wires 74 and 76 lead from the coil 34 to the selector-amplifier apparatus shown in Fig. 6.

The selected low frequency range between 5 and 20 cycles per second was determined by test to be most suitable for transmission of the electromagnetic waves through a steel pipe. While frequencies as high as 100 cycles per second can be used successfully, an increase from about 20 cycles to 120 cycles per second decreases about tenfold the sound produced by a receiver at a fixed distance away in response to transmitted electromagnetic waves. Increasing the frequency to 200 cycles per second again decreases the sound approximately tenfold, and further increases in frequency effect proportionately lesser decreases in sound.

Similar tests demonstrated that the apparatus of the invention, when operated within a buried pipe, could send and receive clearly audible signals for a distance of about 20 feet, and that for the first eight feet no discernible reduction in sound intensity can be noted. It was further observed in these test runs that an audible sound is produced when the pipe scraper in the pipe comes within about 20 feet of a point directly beneath the receiver and it increases with varying intensities until directly beneath and then decreases, in the same manner, as the scraper moves away.

In several test operations, pipe line scrapers containing transmitters of each type above described were directed through approximately 40 miles of pipe line to a trap of usual design for removal of the scraper. The course of the scraper in every instance was easily followed. Operators with portable receivers either went to or were stationed at accessible points along the way and in every instance the passage of the scraper (at about 5 miles per hour) was readily discerned.

Operation of the transmitter of invention demonstrated that it would broadcast continuously for a substantially uniform maximum distance (about 16 to 20 feet) for a period of ten days before loss of battery strength reduced the range to an unsatisfactory degree. This period is of course many times the normal unit operating period of a pipe line scraper.

It is understood that the combination of invention is not limited to the receiver apparatus hereinbefore described but that other conventional filtering and amplifying circuits may be employed. Further, the signal need not be converted to an audible impulse in the manner described, but rather it may as well be employed to alert the visual signal or to excite sending apparatus disposed, for example, at fixed points along a pipe line whereby a path of a pipe line scraper can be followed to a central station. Thus a novel method of operating pipe line scrapers in petroleum product pipe lines and removing them from the pipe line can readily be employed in conjunction with the described instrument. A scraper bearing the described transmitter is inserted at a point in the pipe line; at another point along the pipe line, usually not far from the scraper trap, a receiver is stationed, either with an operator or equipped with transmitting apparatus; and upon passage of the scraper through the pipe this information is transmitted by man or solely automatic means to a maintenance crew who can repair to the scraper trap and remove the scraper without delay.

Having now described my invention, I claim the following:

1. In a locatable pipe line scraper that is adapted continuously to signal its presence in a pipe line to a selector-amplifier receiver that is accessibly located and is adjusted to receive only magnetic signals of uniform frequency, a transmitter that is integrally assembled with the scraper and comprises in a circuit: a battery power supply mounted within a hollow tube constituting a member of said scraper; a fixed frequency interrupter also mounted therein and comprising a switch member so disposed in the circuit with respect to an electromagnet as to be drawn toward one pole thereof when the latter is energized and, by said movement, to effect an opening and closing of the said circuit, and a delay means of such disposition with relation to the electromagnet and the switch member, that when the circuit controlled by the said switch member is closed its subsequent opening will be momentarily delayed; and an electromagnet that is integrally assembled with the said scraper and is turned off and on by said interrupter whereby an electromagnetic field of fixed frequency is generated by the said electromagnet.

2. The transmitter of claim 1 in which one single electromagnet constitutes the electromagnet toward which the said switch member is moved and the electromagnet which generates the said electromagnetic field of fixed frequency.

3. In a locatable pipe line scraper that is adapted continuously to signal its presence in a pipe line to a selector-amplifier receiver that is accessibly located and is adjusted to receive only magnetic signals of uniform frequency, a transmitter that is integrally assembled with the scraper and comprises in a transmitter circuit: a battery power supply mounted within a hollow tube constituting a member of said scraper; a fixed frequency interrupter also enclosed in said tube and comprising a wound core disposed in a secondary, interrupter circuit and electrically connected to a battery of said power supply, an armature disposed in the secondary circuit adapted to move toward the said wound core when the core is energized and so break the secondary circuit and close the said transmitter circuit, and a condenser of selected capacitance relative to the resistance of the wound core so as momentarily to maintain the energizing of the wound core after the secondary circuit is broken; and an electromagnet that is integrally assembled with the said scraper and is interruptedly energized at fixed frequency by said power supply and said interrupter in electrical connection therewith whereby an electromagnetic field of fixed frequency is generated by the said electromagnet.

4. In a locatable pipe line scraper that is adapted continuously to signal its presence in a pipe line to a selector-amplifier receiver that is accessibly located and is adjusted to receive only magnetic signals of uniform frequency, a transmitter that is integrally assembled with the scraper and comprises in a transmitter circuit: a battery mounted within a hollow tube constituting a member of said scraper; a fixed frequency interrupter also mounted therein and comprising a vibrating reed of adjustable frequency between about 5 and 50 vibrations per second that is connected in the transmitter circuit in one position of its vibration and breaks the circuit in its other position, and a resilient member forming an electrical contact between said reed and said battery and disposed in the path of said vibration so that the said member will remain in contact with the reed during a portion of its period of vibration and so momentarily maintain a closed transmitter circuit; and an electromagnet that is integrally assembled with said scraper and toward which the said reed is attracted when the electromagnet is energized, which electromagnet is electrically interconnected with said interrupter and said battery so that it will be interruptedly energized at fixed frequency whereby an electromagnetic field of fixed frequency is generated by the said magnet.

5. In a locatable pipe line cleaner apparatus, having a transmitter that is assembled to travel with a pipe line scraper and is adapted continuously to signal the presence of the scraper in a pipe line to a selector-amplifier receiver accessibly located and adjusted to receive only magnetic signals of uniform frequency from the transmitter, the apparatus comprising, in a circuit: a battery supported within a hollow housing disposed along the axis of the scraper; a fixed frequency interrupter also mounted therein and comprising a switch member so disposed in the circuit with respect to an electromagnet as to be drawn toward one pole thereof when the latter is energized and, by said movement, to effect an opening and closing of the said circuit; and an electromagnet that is also mounted within the said hollow housing and is alternately energized and de-energized by the said interrupter and battery, whereby an electromagnetic field of fixed frequency is generated by the said electromagnet, and a secondary magnetic field outside of the pipe is induced, to which secondary field said selective-amplifier receiver is responsive to indicate the presence of the scraper.

IRVING R. BRENHOLDT.

REFERENCES CITED

The following references are of record in the file of this patent:

UNITED STATES PATENTS

| Number | Name | Date |
|---|---|---|
| 576,425 | Bilton et al. | Feb. 2, 1897 |
| 1,036,817 | Erickson | Aug. 27, 1912 |
| 1,212,763 | Gregory | Jan. 16, 1917 |
| 1,287,251 | Darley | Dec. 10, 1918 |
| 1,643,270 | Greiner | Sept. 20, 1927 |
| 2,050,665 | Matthews et al. | Aug. 11, 1936 |
| 2,092,951 | Blake | Sept. 14, 1937 |
| 2,176,447 | Vilkomerson | Oct. 17, 1939 |
| 2,428,326 | Fay | Sept. 30, 1947 |